US008910848B2

(12) United States Patent
Hauta-Aho

(10) Patent No.: US 8,910,848 B2
(45) Date of Patent: Dec. 16, 2014

(54) METHOD FOR MANUFACTURING BEAM, AND BEAM

(71) Applicant: Steel-Invest Ltd., Seinajoki (FI)

(72) Inventor: Seppo Hauta-Aho, Seinäjoki (FI)

(73) Assignee: Steel-Invest Ltd., Seinajoki (FI)

( * ) Notice: Subject to any disclaimer, the term of this patent is extended or adjusted under 35 U.S.C. 154(b) by 0 days.

(21) Appl. No.: 13/974,934

(22) Filed: Aug. 23, 2013

(65) Prior Publication Data

US 2014/0053501 A1    Feb. 27, 2014

Related U.S. Application Data

(62) Division of application No. 13/113,194, filed on May 23, 2011, now Pat. No. 8,517,247.

(30) Foreign Application Priority Data

Mar. 11, 2011    (EP) .................................... 11157809

(51) Int. Cl.
| | | |
|---|---|---|
| *B23K 37/00* | (2006.01) | |
| *B23K 37/04* | (2006.01) | |
| *E04C 3/08* | (2006.01) | |
| *B23K 31/02* | (2006.01) | |
| *E04B 5/29* | (2006.01) | |
| *E04C 3/04* | (2006.01) | |

(52) U.S. Cl.
CPC ........... *E04C 3/08* (2013.01); *E04C 2003/0465* (2013.01); *E04C 2003/043* (2013.01); *B23K 31/022* (2013.01); *B23K 2201/28* (2013.01); *E04C 2003/0413* (2013.01); *E04C 3/016* (2013.01); *E04B 5/29* (2013.01)

USPC .................... 228/8; 228/9; 228/43; 228/47.1; 228/49.1

(58) Field of Classification Search
None
See application file for complete search history.

(56) References Cited

U.S. PATENT DOCUMENTS

| | | | |
|---|---|---|---|
| 1,837,088 A | | 12/1931 | Watson |
| 4,301,348 A | * | 11/1981 | Nakazima .................... 219/61.2 |
| 4,407,486 A | * | 10/1983 | Mills et al. ...................... 266/87 |
| 5,632,577 A | | 5/1997 | Peroni |
| 5,682,576 A | * | 10/1997 | Sakai et al. ..................... 399/69 |
| 5,932,123 A | * | 8/1999 | Marhofer et al. ........ 219/130.01 |
| 5,994,665 A | * | 11/1999 | Nishibayashi et al. .. 219/121.64 |
| 6,078,781 A | * | 6/2000 | Takagi et al. .................. 399/330 |
| 6,189,763 B1 | * | 2/2001 | Tazoe et al. .................... 228/5.7 |

(Continued)

FOREIGN PATENT DOCUMENTS

| | | |
|---|---|---|
| GB | 454895 | 10/1936 |
| JP | 47-002732 | 1/1971 |

(Continued)

OTHER PUBLICATIONS

Farkas J et al: "Analysis of some methods for reducing ... shrinkage", Welding in the World, Elsevier/Intern'l Institute of Welding, Roissy, FR, vol. 41, No. 5, Sep. 1998.

(Continued)

*Primary Examiner* — Kiley Stoner
(74) *Attorney, Agent, or Firm* — Otterstedt, Ellenbogen & Kammer, LLP

(57) ABSTRACT

A beam includes at least three web plates that are connected to a bottom flange and top flange.

3 Claims, 4 Drawing Sheets

(56) References Cited

U.S. PATENT DOCUMENTS

| | | | |
|---|---|---|---|
| 6,937,329 B2* | 8/2005 | Esmiller | 356/237.2 |
| 6,942,139 B2* | 9/2005 | Lipnevicius | 228/102 |
| 2002/0005397 A1* | 1/2002 | Bong et al. | 219/125.1 |
| 2002/0195446 A1* | 12/2002 | Galloway | 219/652 |
| 2003/0038156 A1* | 2/2003 | Artelsmair et al. | 228/102 |
| 2004/0112940 A1 | 6/2004 | Caddell et al. | 228/103 |
| 2005/0023262 A1* | 2/2005 | Bong et al. | 219/130.5 |
| 2005/0029326 A1* | 2/2005 | Henrikson | 228/8 |
| 2005/0167468 A1* | 8/2005 | Kislovsky et al. | 228/8 |
| 2008/0011727 A1 | 1/2008 | Peters | |
| 2008/0061113 A9* | 3/2008 | Seki et al. | 228/103 |
| 2008/0206586 A1* | 8/2008 | Imanaga et al. | 428/598 |
| 2008/0296353 A1* | 12/2008 | Simmons | 228/176 |
| 2009/0014497 A1* | 1/2009 | Ryu | 228/2.3 |
| 2009/0308846 A1 | 12/2009 | Bong | |
| 2009/0313937 A1 | 12/2009 | Zureick et al. | |
| 2010/0065539 A1 | 3/2010 | Daniel et al. | |
| 2010/0095527 A1 | 4/2010 | Peterson | |
| 2010/0205891 A1 | 8/2010 | Bong | |
| 2010/0213179 A1 | 8/2010 | Peters | |
| 2011/0168693 A1* | 7/2011 | Rudd et al. | 219/600 |
| 2011/0174794 A1* | 7/2011 | Doskocz | 219/136 |
| 2012/0012643 A1* | 1/2012 | Beech et al. | 228/102 |
| 2012/0097645 A1 | 4/2012 | Clark | |
| 2012/0152398 A1* | 6/2012 | Laymon | 138/155 |
| 2013/0134153 A1* | 5/2013 | Schmitt et al. | 219/617 |

FOREIGN PATENT DOCUMENTS

| | | | |
|---|---|---|---|
| JP | 1971003006 | | 8/1972 |
| JP | 59-199182 A | * | 11/1984 |
| JP | 60046884 | | 3/1985 |
| JP | 61-286004 A | * | 12/1986 |
| JP | 01-181996 A | * | 7/1989 |
| JP | H04104504 | | 9/1992 |
| JP | 05-031589 A | * | 2/1993 |
| JP | H0579411 | | 10/1993 |
| JP | H0633516 | | 2/1994 |
| JP | H07166503 | | 6/1995 |
| JP | 2000-142458 | | 5/2000 |
| JP | 200990796 | | 4/2009 |
| RU | 29064 U1 | | 4/2003 |
| RU | 79092 U1 | | 12/2008 |
| SU | 984767 A | | 1/1983 |

OTHER PUBLICATIONS

Dorofeev, Russian Patent Office, Examination report of Russian patent Application 2011-122115, Nov. 7, 2012.

E.I.Belenj, "Metal Constructions". "Strojizdat" Publishing House, Moscow, 1976, pp. 181, 182.

Examiner Hideotoshi Nishida, Japanese Patent Office, First Office Action, Japanese Patent Application No. 2012-054902 mailed Aug. 6, 2013, and English translation thereof.

Dorofeev, Russian Patent Office, Examination report of Russian patent Application 2011-122115, Jul. 19, 2013.

* cited by examiner

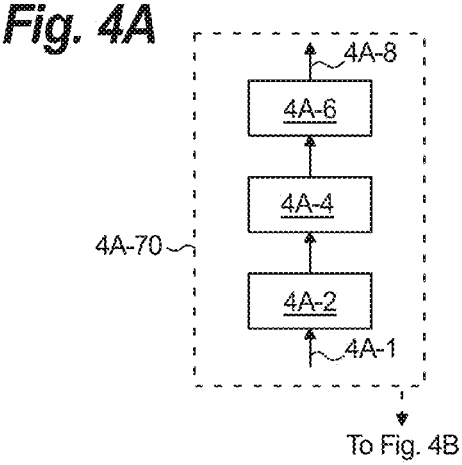
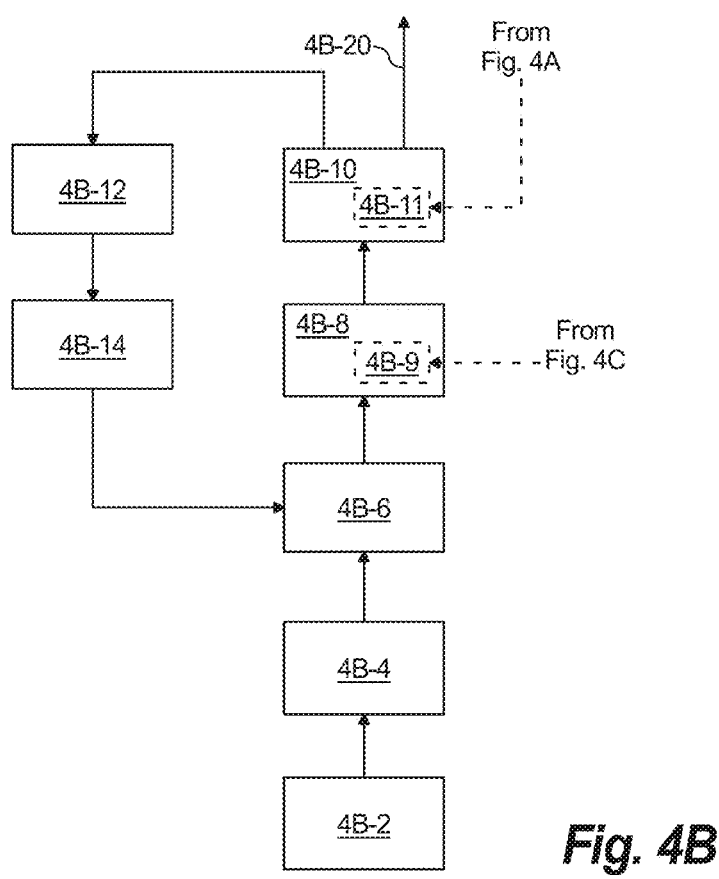

US 8,910,848 B2

METHOD FOR MANUFACTURING BEAM, AND BEAM

CROSS-REFERENCE TO RELATED APPLICATIONS

This application is a divisional of U.S. application Ser. No. 13/113,194, filed May 23, 2011, now U.S. Pat. No. 8,517,247, which in turn claims the benefit of European Patent Application Number 11157809.2, filed Mar. 11, 2011. The complete disclosures of U.S. application Ser. No. 13/113,194 and European Patent Application Number 11157809.2 are expressly incorporated herein by reference in their entireties for all purposes.

FIELD OF THE INVENTION

The invention relates to a beam, and especially to a rail beam, and to a method for its manufacture.

BACKGROUND OF THE INVENTION

A beam is a horizontal or inclined support used in construction engineering. The task of a beam in a structure is to support upper structures, such as floor slabs, roof, ceiling, bulkhead, bridge, road, or rails, for instance.

In many applications, the beam has a precise specification, definition, and instructions according to which the beam is to be manufactured during the manufacturing phase. The manufacture of a steel rail beam of a train, for instance, has to be done manually. During manufacturing a positioning mould or fasteners or jig is/are made for the rail beam. However, a problem with the prior art is that the rail beam does not keep to the tolerances in the jig after manufacturing due to deformations caused by heat input directed to the seams of the beam during manufacturing.

Thus, the beam does not meet the vertical tolerance, up/down tolerance and/or horizontal tolerance, left/right tolerance. A finished beam that is not according to the tolerances also cannot be straightened or made to comply with the specification afterward.

BRIEF DESCRIPTION OF THE INVENTION

It is thus an object of the invention to develop a beam, a method for manufacturing a beam, and an apparatus implementing the method in such a manner that the above-mentioned problems are solved. The object of the invention is achieved by a method and system which are characterized by what is disclosed in the independent claims. Preferred embodiments of the invention are disclosed in the dependent claims.

The invention is based on the fact that the heat input used in manufacturing the beam is controlled and monitored centrally and, thus, the manufacturing tolerances are achieved by the method and apparatus of the invention and its preferred embodiments.

The method and system of the invention provides the advantage that it is possible to manufacture during the manufacturing process automatically a dimensionally accurate beam according to the specification, that is, a final product complying with the manufacturing tolerances.

BRIEF DESCRIPTION OF THE FIGURES

The invention will now be described in greater detail by means of preferred embodiments with reference to the accompanying drawings, in which:

FIG. 4A shows a method for manufacturing a beam according to the invention and its preferred embodiments;

FIG. 4B shows a method for manufacturing a beam according to the invention and its preferred embodiments.

DETAILED DESCRIPTION OF AT LEAST ONE EMBODIMENT

The following description describes a steel rail beam of a magnetic train, and a method and apparatus for manufacturing a rail beam, but it should be understood that the beam can also be made of other materials or material combinations and that the beam of the invention and its preferred embodiments can also be used for many other purposes.

In the description, a jig refers to the central web of the rail beam of the magnetic train, that is, the mould, positioning mould, or fasteners according to which or supported by which the beam or a part thereof can be made. A jig can also refer to the shape or mould of a three-web beam, to which the beam is set in a first step so as to make the rest of the beam in a second step. In the case of a three-web beam, for instance, the jig is formed in the first step and then used as support or mould in the second step of manufacturing the beam. The jig may be an H beam, H portion, or H jig that serves as a mould as the side plates are added. The central web may also be perforated. A jig may also refer to a jig built inside the beam. The central web may serve as the jig, and the jig may accompany the finished beam until its installation. The internal jig may be symmetric or asymmetric.

Figure 1:
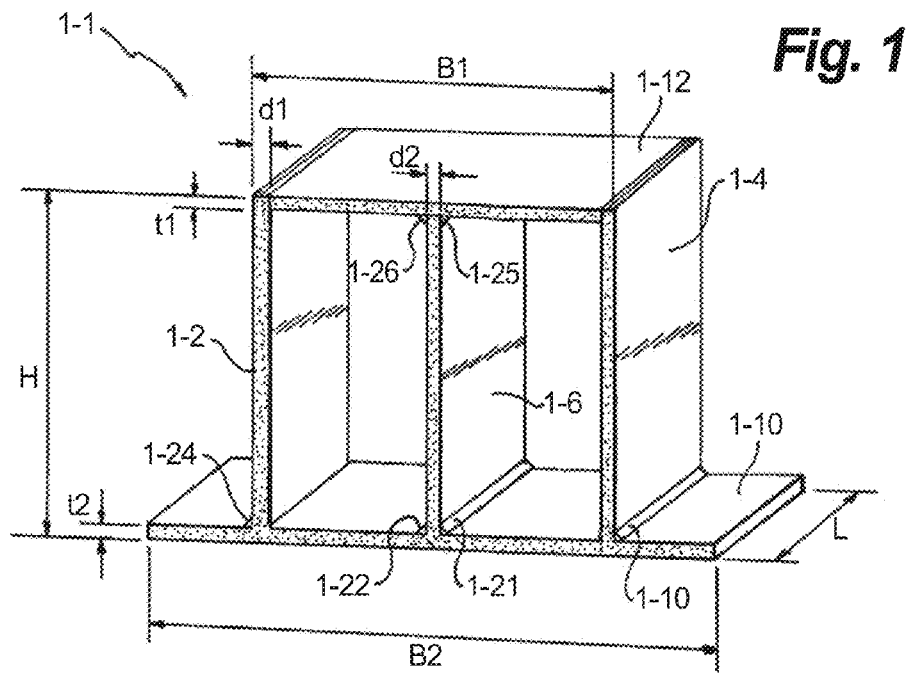
FIG. 1 shows a first beam according to the invention and its preferred embodiments.
Figure 2:
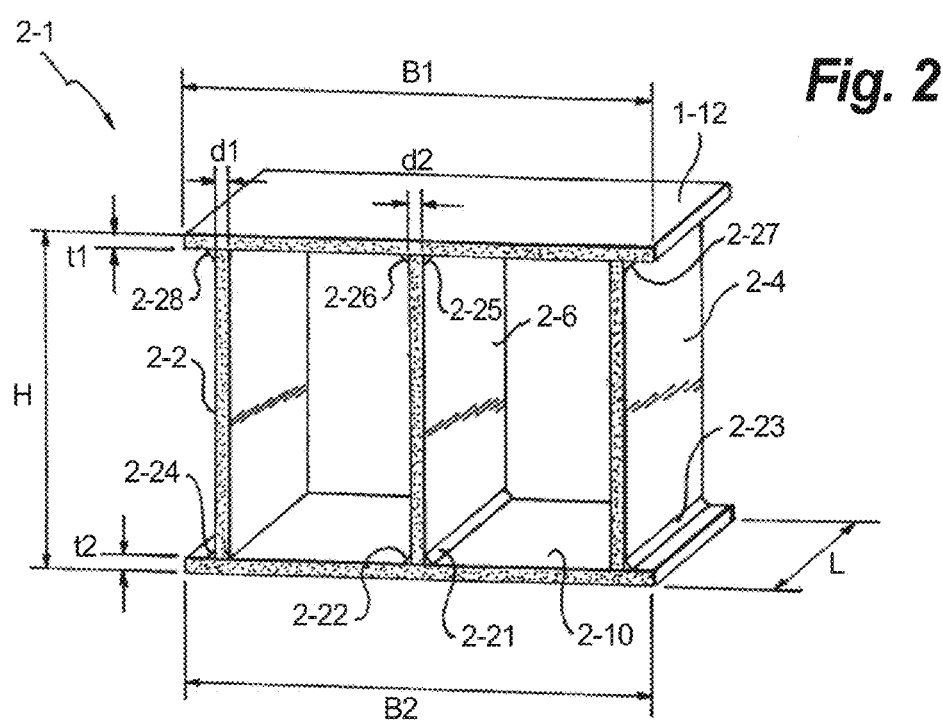
FIG. 2 shows a second beam according to the invention and its preferred embodiments.

FIGS. 1 and 2 show the first and second beams according to the invention and its preferred embodiments. The beams have two horizontal plate-like parts or flanges and three vertical plate-like parts or webs: edge webs 1-2, 1-4 (FIG. 1) and 2-2, 2-4 (FIG. 2) and a third web or central web 1-6 (FIG. 1) and 2-6 (FIG. 2) between the edge webs. The webs can be joined at their first ends fixedly or detachably to a first horizontal plate-like part or flange, for instance bottom flange 1-10, 2-20 (FIGS. 1 and 2). The webs can be joined at their second, opposite ends fixedly or detachably to a second horizontal plate-like part or flange, for instance top flange 1-12, 2-12 (FIGS. 1 and 2).

Figure 3:
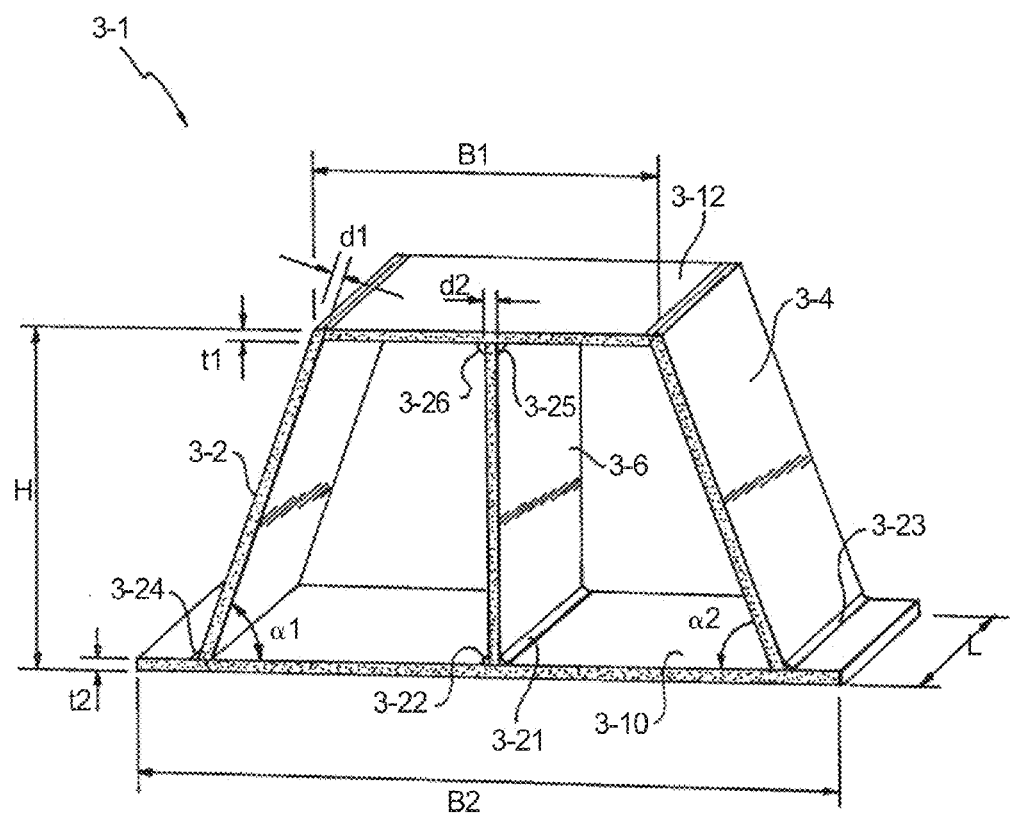
FIG. 3 shows a third beam according to the invention and its preferred embodiments.

The horizontal plate-like parts may be substantially parallel to each other, as shown in FIGS. 1, 2, and 3. All webs may be substantially parallel to each other, as shown in FIGS. 1 and 2. The webs may be at a substantially perpendicular angle to the bottom flange and top flange.

The vertical parts are intended, among other things, to provide the structure with vertical rigidity and to transmit forces in the top flange to the bottom flange and through the bottom flange on to the next structural part, for example, that may be a foundation of a structure, structural part, or structural entity or another structure, or structural part, or beam. The horizontal parts are intended to provide the beam with horizontal rigidity.

In FIG. 1, the edge-most two webs are connected to opposite edges of the top flange. The first web 1-2 is, thus, connected to the top surface of the bottom flange and a first edge of the top flange, and the second web 1-4 is connected to the top surface of the bottom flange at a distance from the first and third webs and to a second edge of the top flange that is at the opposite end of the flange to the first edge of the flange. The middle, third web 1-6 is connected between the flanges at a distance from the edge-most webs.

In FIG. 2, all three webs are connected entirely between the bottom and top flanges at a distance from each other, and the bottom and top flanges are at a distance from each other. Thus, the middle web plate may be connected entirely or partly between the bottom and top flanges and the middle web plate may reside at a distance from first and second side web plates.

In FIG. 3, the edge-most two webs 3-2, 3-4 are also connected to opposite edges of the top flange 3-12. The first web 3-2 is then connected to the top surface of the bottom flange and the first edge of the top flange. The second web 3-4 is connected to the top surface of the bottom flange at a distance from the first web and to the second edge of the top flange that is at the opposite end of the flange to the first edge of the flange. The middle, third web 3-6 is connected between the flanges. In FIG. 3, the first web 3-2 is at an inclined position to the top and bottom flanges, at an angle $\alpha_1$ to the bottom flange, and the second web 3-4 is at another inclined position to the top and bottom flanges, at an angle $\alpha_2$ to the bottom flange. The inclination angle may be the same, as shown in FIG. 3, or different for both or all inclined webs. In FIG. 3, the middle web 3-6 is at a substantially perpendicular angle to the bottom and top flanges.

According to a preferred embodiment, the beam may be inclined at one or both ends. In such a case, one or more webs may be inclined or cut at an angle to the longitudinal direction of the beam, and the top or bottom flange may begin at a distance from the other flange. The web(s) may also be cut in such a manner that the desired end gradient is obtained.

A beam according to the invention and its preferred embodiments may also comprise more or fewer than three vertical plate-like parts. There may also be more than two horizontal plate-like parts. The beam according to the invention and its preferred embodiments may also be used in another position than that shown in the figures, for instance in an upside down or slanted position.

According to a preferred embodiment, two or more plate-like parts may be on top of each other or side by side against each other. Thus, the middle web, for instance, may have two plate-like parts joined together or one thicker plate-like part, the thickness of which may be approximately two or three times the thickness of the outer web, basic web or flange, for instance. One or more outer webs may also be thicker than the other plate-like parts. In addition or alternatively, the horizontal parts may either be substantially equal in thickness or one part may be thicker, for instance approximately two or three times thicker than the other web. According to yet another alternative, the top flange may be uniform in thickness or comprise two or more parts of different thicknesses. The same applies to the bottom flange and/or web.

A structurally correct and accurately dimensioned beam should meet certain requirements. According to an alternative, the beam or beam profile of FIG. 1 should meet the conditions of the following model:

$$HSDQ-H \times d1/d2-t1 \times B1/t2 \times B2-L \quad (1)$$

wherein HSDQ represents a dynamically loaded three-web Q casing, H is the total height of the web, bottom beam and top beam, d1 is the thickness of the edge plate, d2 is the thickness of the middle plate, t1 is the thickness of the top flange, t2 is the thickness of the bottom flange, B1 is the width of the top part of the profile or the width including the thicknesses of both edge plates, B2 is the width of the bottom flange or the width of the bottom part of the profile or the width of the profile, and L is the length of the top flange and bottom flange or profile. The beam may also be called a casing. Dynamic load refers to the fact that, in addition to the static load used in conventional construction, the beam withstands traffic loads, earthquake loads, impacts, etc. A beam withstanding dynamic loads withstands a moving load better than a construction beam dimensioned for static load. A beam according to the invention and its preferred embodiment may withstand static and/or dynamic loads.

According to an alternative, the beam or beam profile of FIG. 2 should meet the conditions of the following model:

$$HSDK-H \times d1/d2-t1 \times B1/t2 \times B2-L \quad (2)$$

wherein HSDK represents a dynamically loaded three-web K casing, H is the total height of the web, bottom beam and top beam or the height of the profile from the bottom surface of the bottom flange to the top surface of the top flange, d1 is the thickness of the edge plate, d2 is the thickness of the middle plate, t1 is the thickness of the top flange, t2 is the thickness of the bottom flange, B1 is the width of the top part of the profile or the width of the top flange, B2 is the width of the bottom flange or the width of the bottom part of the profile or the width of the profile, and L is the length of the top flange and bottom flange and web or profile.

According to an alternative, the beam or beam profile of FIG. 3 should meet the conditions of the following model:

$$HSDA-H \times d1/\alpha/d2-t1 \times B1/t2 \times B2-L \quad (3)$$

wherein HSDA represents a dynamically loaded three-web slant-webbed A casing, H is the total height of the middle web, bottom beam and top beam or the height of the profile from the bottom surface of the bottom flange to the top surface of the top flange, d1 is the thickness of both edge plates, d2 is the thickness of the middle plate, t1 is the thickness of the top flange, t2 is the thickness of the bottom flange, B1 is the width of the top flange including the thicknesses of both edge plates, or the width of the top part of the profile, B2 is the width of the bottom flange or the width of the bottom part of the profile, and L is the length of the bottom flange and top flange and web or profile.

In FIG. 1, the height H of the beam from the bottom flange to the top flange may be 250 mm . . . 3000 mm. The thickness t1 of the top flange and the thickness t2 of the bottom flange may be 6 mm . . . 60 mm. The width B2 of the bottom flange may be 290 mm . . . 3000 mm. The thickness of webs d1 and d2 may be 5 mm . . . 20 mm. The width B1 of the top part of the beam, including the thicknesses of the edge-most webs in FIG. 1, may be 250 mm . . . 2800 mm.

In FIG. 2, the height H of the beam from the bottom flange to the top flange may be 250 mm . . . 5000 mm. The thickness t1 of the top flange and the thickness t2 of the bottom flange may be 8 mm . . . 100 mm. The width B2 of the bottom flange may be 250 mm . . . 2000 mm. The thickness of webs d1 and d2 may be 5 mm . . . 30 mm. The width B1 of the top part of the beam may be 250 mm . . . 2000 mm.

In FIG. 3, the height H of the beam from the bottom flange to the top flange may be 300 mm . . . 3000 mm. The thickness t1 of the top flange and the thickness t2 of the bottom flange may be 8 mm . . . 60 mm. The width B2 of the bottom flange may be 500 mm . . . 3000 mm. The thickness d1, d2 of the webs may be 5 mm . . . 20 mm. The width B1 of the top part of the beam, including the thicknesses of the edge-most webs in FIG. 3, may be 250 mm . . . 1500 mm. The angle $\alpha_1$, $\alpha_2$ between the edge-most webs and the bottom beam may be larger than or equal to 45 degrees, but smaller than 90 degrees, such as 50, 60, 66, 75, 80, or 85 degrees.

The length L of the beam may in all cases be 5 m, 16 m, 32 m, 50 m, or 64 m, for example. The length of the beam may be optimized to be as long as possible in such a manner that the curvature properties of the beam remain within tolerances.

The vertical plate-like parts can be fastened, connected, or joined to the edges or surfaces, such as top surface and bottom surface, of the horizontal plate-like parts. The vertical plate-like parts can thus be connected entirely between the bottom and top flanges, for instance. Alternatively, one or more webs can be connected to the edge of either flange. The webs can also be arranged in various tilted positions. The structure of the invention and its preferred embodiments can be said to be a casing structure which is a very bearing structure.

Joining the plate-like parts together may take place in many different ways. Connecting the webs to the flanges, the flanges to the webs, or one beam to another to form a beam entity may take place by welding or soldering, for instance.

According to the invention and its preferred embodiments, it is possible to affect the size, thickness, flatness, surface quality, and structural strength of a piece, for example, and all these properties may be made suitable according to the final specifications. In manufacturing where metal is rolled, a piece of metal is run between rolls of a rolling mill to modify the metal to a required form.

In welding, two or more pieces or parts thereof are joined together by utilizing heat and/or compression in such a manner that the pieces or parts thereof form a continuous connection. In welding, it is possible to use several different heat sources, such as electric current, heat due to friction, flame, laser beam or electron beam, or a combination thereof. Welding may thus be laser welding, for instance. An additional material with a melting point nearly the same as that of the basic material may be used in welding.

When joining two or more pieces or parts thereof together by soldering, only the soldering material or joining material melts, and the pieces being joined together do not.

The beam and the plate-like parts can be made of one or more parts. The beam and the plate-like parts may comprise one or more materials. The may be made of aluminium, steel, alloy, thermoplastic, concrete, wood, or a combination thereof. The beam may also be partly or entirely transparent. The beam or plate-like parts may have one or more openings for adjusting the bearing value of the structure or enabling lead-throughs, for instance.

FIG. 1 shows eight welds. The middle web may be connected with four welds, of which two 1-21, 1-22 are at the bottom flange and two 1-25, 1-26 at the top flange. In addition, the edge webs may be connected to the bottom flange with one or more welds 1-23, 1-24, and to the top flange with one or more welds.

FIG. 2 shows eight welds. The middle web may be connected with four welds, of which two 2-21, 2-22 are at the bottom flange and two 2-25, 2-26 at the top flange. In addition, the edge webs may be connected to the bottom flange with one or more welds 2-23, 2-24, and to the top flange with one or more welds 2-27, 2-28.

FIG. 3 shows eight welds. The middle web may be connected with four welds, of which two 3-21, 3-22 are at the bottom flange and two 3-25, 3-26 at the top flange. In addition, the edge webs may be connected to the bottom flange with one or more welds 3-23, 3-24, and to the top flange with one or more welds. The welds may be made to extend from the angle formed by the plate parts being joined together. Alternatively, grooves may be formed for the seams to be filled by welding.

In joining, as in welding, two or more seams may be welded substantially simultaneously. According to a preferred embodiment, two or four seams are welded or otherwise joined together substantially simultaneously. The seams may also be welded using the method at different times, alternately or partly alternately in accordance with the technical tolerance requirements of the rail beam.

When joining plate-like parts together by welding, the welding point(s) generate energy through the welding blowpipe to the welding site and seam. This energy and/or other measurable quantities may be measured from each seam or from one or more welding points of a seam, for instance. It is then possible to measure during joining, during welding or in connection with welding, the energy input to the seam or the joining point of parts being connected, or used in welding or joining the beam parts, the energy generation value, or a quantity directly or inversely proportional to the input energy. The measured value may be the input heat or energy per unit of length, for example. Thus, the value may be kJ/mm, for instance.

The measured value, energy or energy amount may be compared with one or more reference values. At least partly in response to the comparison, it is possible to calculate or otherwise define a new or subsequent value for the energy amount to be input to the joining point. In other words, in response to measuring the amount of energy input to the joining point and/or used in joining, the amount of energy input to the joining point is adjusted. The latter value may be the same as or different than the former value.

In the manufacturing method of the rail beam, it is possible to use in energy measurement, among other things, a measured welding current, voltage, arc voltage, current type, temperature, transport rate, and velocity, from which thermal energy can be calculated or derived using selected values. Of these, it is possible to measure one, two or four quantities at a time at one, preferably four, locations or points. The measuring apparatus is placed in the assembly device or in connection with it. It is also possible to set one or more limit values or initial values for these quantities.

For instance, in manufacturing a rail beam of a magnetic train, the tolerance must be precise, and the train must not derail or take off from the rail. In such a case, one important manufacturing criterion of the beam is the vertical curvature tolerance that can be measured and compensated for, and the beam manufactured accurately in accordance with the invention and its preferred embodiments, whereby the problem of the warping of the beam can be solved. It should be noted that on a magnetic railway, the speed of the train may be 500 km/h or more.

In the assembly apparatus, the values of the welding parameters can be read on the control panel during welding and also used for measuring the energy of heat input. In other words, the input of thermal energy can be measured and the allowed and selected values monitored and read on the measuring display for each weld in the system of the assembly apparatus.

When the parameter values are changed, it is possible by means of thermal energy to synchronize the warping of the beam by welding points during the manufacture. Input of thermal energy can also be measured with separate sensors. The assembly apparatus may compare a signal received from a sensor with one or more predefined threshold values or limit values and/or another measuring value, and adjust the energy or power being supplied on the basis of the measurement and comparison. By means of the control value received from the apparatus, it is possible to control the manufacture of a rail beam in the system according to the tolerance requirements of the rail beam. The value of the energy supplied to the seam or the maximum value of heat input can be obtained from the material specifications of the beam material supplier, such as from the values provided by steel suppliers for different steel grades.

The energy value input to each seam or part thereof can, thus, be measured and adjusted individually. Alternatively, the adjustment may be substantially simultaneous and/or equivalent. For instance, it is possible to use an energy input synchronization device or measuring system of the assembly apparatus to measure that the same amount of energy is input to each seam. This way, the parts to be joined to the beam or the section of the beam to be seamed are kept substantially straight or at a required straightness or curvature.

The energy input measuring apparatus is a system in the method of the invention and is, thus, adapted to control the amount of energy input to the seam in all or some of the seams. The apparatus is also adapted to keep the energy values exactly the same or substantially the same. According to an alternative embodiment, the energy amount input to the seams is substantially the same in one entire seam but different in value than in at least one other entire seam or part thereof.

Seam-specific parameter information may be provided for different seams for controlling the method and for the measurement received through sensors. Cutting parameters of the plates that may affect the shape of the beam by causing warping, for instance, may be used as these factors. The warping may be compensated or it may be caused by a controlled energy input synchronization device in the method for manufacturing a beam and rail beam.

As stated above, according to the invention and its preferred embodiments, the beam comprises at least two webs that are connected to a bottom flange and a top flange. In the method for manufacturing a beam, a beam part is transferred from storage 4B-2 to a cutting apparatus 4B-4 that cuts the plate parts of the beam to specific dimensions, and the plate parts cut to size are transferred to an assembly conveyor 4B-6. After this, at least two plate parts of a beam are set together by means of pressure rolls of the assembly conveyor 4B-6 to form a beam with a final cross-section. The beam parts set together are moved with the assembly conveyor to an assembly device 4B-8.

Figure 4C:
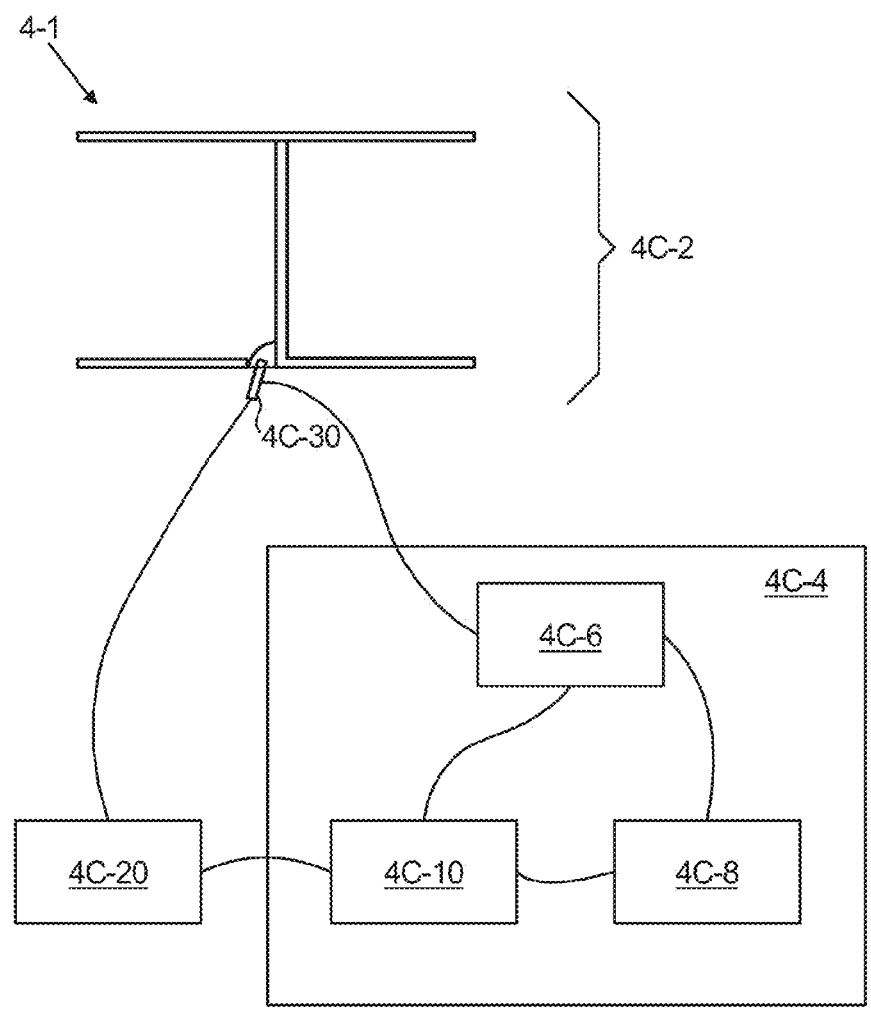
FIG. 4C shows a method for manufacturing a beam according to the invention and its preferred embodiments.

In the first step of manufacturing a beam, the assembly device is arranged to connect the middle web plate of the beam to the bottom and top flanges to form a jig beam 4C-2 (FIG. 4C). The connection may take place by supporting or welding the middle web plate at least at one point to the bottom flange and at least at one point to the top flange. In the second step of manufacturing a beam, the assembly device is arranged to connect to the first edge of the jig beam a first side web plate and at a distance from the first side web plate to the opposite, second edge of the jig plate a second web plate by supporting or welding, and both the first and second side web plates on at least one side to the bottom and top flanges. Welding may be done by a welding machine 4C-20 in the assembly device or connected thereto.

The beam formed in the first step is moved from the assembly device 4B-8 to a discharge conveyor 4B-10. The formed beam or part thereof is moved 4A-1 to a control apparatus 4A-2 that checks the shape of the beam made in the first step, such as the straightness and tolerance deviations of the plate parts and the entire unit.

An arrangement for manufacturing a beam may comprise a straightener and a bending device. The straightener may be arranged to straighten the flanges and the bending device may be arranged to bend the curvature of the beam jig, that is, the middle web and the entire beam in a three-web beam. When the middle web beam—for instance an H beam with a web plate and flanges—has been made and both of its sides welded, side plates are added to both sides. However, the beam may be run through the straightener before adding the side plates. When the side plates have also been added to the beam, the curvature of the entire beam may be vertically and/or horizontally fine-adjusted and the beam checked and measured at a bending station.

If the result of the check-up from the control apparatus, such as the straightness value or tolerance deviations, is not within predefined limit values, the beam formed in the first step is fed to the straightener 4A-4 to straighten the part exceeding the limit value with hydraulic presses of the device and/or to the bending device 4A-6 to bend the part exceeding the limit value with hydraulic presses of the device.

The calibration of the beam by 3-dimensional laser measurement, for instance, can also be done in the straightener 4A-4. The middle web beam can, thus, be run through the straightener, because heat may bend the plates, flanges or webs. Especially wide plates, such as the top flange, may bend. After the straightener, the piece may be transferred to the bending device, where it is forced by repeated bendings to an exact size and shape. This process can be done for instance after all four welds of the middle web beam have been welded or all eight welds of the entire piece have been welded. The straightness and/or curvature can be measured by laser measuring to immediately find out whether the piece is within tolerances, that is, as straight and curved as planned, or will the beam or piece need to be pressed to become slightly warped, over-curved or under-curved. For instance, a piece can be made straight or warped with an internal jig.

After this, the beam made in the first step is transferred from the discharge conveyor 4B-10 to a turning device 4B-12 to turn the beam or part thereof, such as jig beam. The beam may be turned by the turning device for connecting repeated seams, and it may be turned 180 degrees, for example. From the turning device, the element is moved to a return conveyor or intermediate conveyor 4B-14 and on back to the assembly conveyor 4B-6.

In the second step of assembly, the next beam part or the rest of the plate parts of the beam or side webs are set together by means of pressure rolls of the assembly conveyor 4B-6 to form a beam with a final cross-section. The entire beam is transferred by the assembly conveyor 4B-6 to an assembly apparatus 4B-8 where the seams of the parts set together are supported or welded by a welding machine 4C-20 of the assembly device in the second step of manufacturing the beam.

The beam part or entire beam formed in the second step can also be moved after welding to the control apparatus, straightener and bending device to measure, determine, and repair one or more shapes, straightness, or tolerance deviations.

In other words, the method for manufacturing a beam may comprise the steps of: cutting the plates with a cutting apparatus 4B-4, transferring the plates cut to size to an assembly conveyor 4B-6 and on to a first assembly apparatus 4B-8, assembling the beam of plates with the first assembly apparatus that comprises joining the pressed plate parts together and an energy input measurement and control apparatus and discharge side conveyors 4B-10 having a control apparatus 4A-2 for beam tolerance deviations, turning the beam for joining repeated seams with a turning device 4B-12, and transferring the beam back to the first assembly apparatus with a return conveyor 4B-14 for joining the next seam of the beam and assembling the existing beam. After this, the assembled jig beam is transferred to a second assembly apparatus 4B-8 that comprises joining the pressed side plates together, an energy input measurement and control apparatus and discharge side conveyors that may also contain a control apparatus for tolerance deviations. If necessary, the beam may be transferred to a straightener 4A-4 and bending device 4A-6 for calibration. A control apparatus 4C-10 or adjusting device 4C-8 may be used to control the energy input measurement and control, the control apparatus for beam tolerance deviations, the straightener and/or bending device.

The assembly apparatus may control and monitor the manufacture of the internal jig. Energy input may be controlled in a centralized and seam-specific manner with an energy input synchronization apparatus or control apparatus.

As described above, in the first step, the first part of the beam, H beam or I beam, may be assembled to form the jig beam and, in the second step, side plates may be added to this H beam or I beam. In the first step, the middle web may be welded with two seams to the bottom plate and with two seams to the top plate, that is, in total with four seams, and in the second step, the side webs may be welded with one or two seams to the bottom plate and one or two seams to the top plate. At the first welding station, the entire middle web may be welded on both sides, and after the straightener, at the second welding station, the side webs may be welded to the H beam. After both sides have been run on the second machine, the rail beam comprises eight seams. The rail beam may alternatively comprise a different number of welds than eight, for instance six, ten, or twelve welds. The rail beam may thus comprise at least eight welds, for instance.

For instance in manufacturing a slant-webbed casing beam, it is possible to make the I beam in the first step and then measure the straightness and make corrections, if necessary. In the second step, the slant-webbed plates and backings may be added on both sides by assembling tack welding, for example. The bevels of the casing may be welded full to comply with rivet welding requirements, and finally the straightness of the casing may be measured.

The assembly apparatus, straightener, bending device and/or adjusting apparatus, for example, may be arranged to take into consideration various factors that affect the shape of the beam. These factors may be ones affecting the shape before, during, and after welding, or combinations thereof.

The control panel of the apparatus may comprise display devices that display measuring information, data, and information received from each seam, and control information transmitted to each seam.

By taking into consideration the energy values input in the seams, the vertical and/or horizontal curvature may be taken into account in the manufacture of the beam. During the manufacture, it is also possible to take into consideration the deformation of the beam that takes place over time or due to temperature. The different changes and curvatures may be compensated during manufacture by increasing or decreasing energy input to one or more seams or parts thereof. When manufacturing a beam for a magnetic railway, especially the vertical curvature and bending should be taken into account. One or more limit values or initial values may be given to said changes and vertical and horizontal curvatures.

FIG. 4C shows a method for manufacturing a beam according to the invention and its preferred embodiments. In it, a welding machine 4C-20 welds the seam of the beam. The energy input into the seam can be measured with a sensor 4C-30 connected to a measuring device 4C-6, and the sensor data may be fed into the measuring device and on to an adjusting device 4C-8. The readings of the adjusting device and measuring device can be read on a control panel 4C-10 that may also set control values for the adjusting device, measuring device, and welding machine.

In measuring the energy input to the seam in the manufacturing method of a beam and rail beam, the energy input can be measured at the cross-section of the beam as a function of length at regular or irregular intervals at points L1, L2, L3, etc., where L represents a measure of length starting from zero and ending where the beam ends. Energy can be measured at the top and bottom seams of the middle web and/or top and bottom seams of the side webs. Each energy measurement can be registered automatically during manufacture and, thus, it is possible to send the data over Ethernet, for instance, to the reader, computer, or server where the data can be stored or processed. At least partly in response to this data, the warping of the beam may be prevented. The data can also be used in planning and dimensioning as cutting data of the plate and other corrective data, for instance. Each beam may contain an in-built jig and energy input measurements that follow the beam or beam component until the installation of the beam and rail beam can be stored therein. The data can also be considered part of the life cycle data of the product.

According to a preferred embodiment, energy input is measured as a function of length at four points simultaneously, and in the measurement one or more quantities are used or measured. Thermal energy input to the weld is calculated or derived from the measurement, the measured value is compared with a permanent or variable reference number and, on the basis of the comparison, the energy input to the weld is adjusted to make the energy input to each weld substantially equal.

When manufacturing or making a beam or beam entity of the invention and its preferred embodiments, the plate parts required by the strengthwise optimized dimensioning of the rail beam are assembled together as a continuous process. In the apparatus, the plate parts of the rail beam are located in storage or in a warehouse cut to size or in storage dimensions, and in disassembly and cutting devices. The control of the control apparatus or adjusting apparatus pre-sets the device to correspond to the dimensioning of the beam to be manufactured. After start-up, the work cycle of the apparatus for manufacturing a beam begins. From the storage beams, the plate parts are transferred to assembly conveyors where they are assembled by means of pressure rolls to form a beam with a final cross-section. From the assembly conveyors, the beam proceeds to an assembly device where the seams of the separate plate parts are joined or brought together. The finished beam is transferred to a discharge conveyor.

If the manufacture of the beam requires further processing, the beam is transferred from the discharge conveyor via a turning device and intermediate conveyor back to the assembly device. The apparatus may comprise two or more assembly devices, in which case the intermediate conveyor is not needed. The straightness of the beam is checked and the calibration done in a straightener to which the beam moves via a conveyor.

The first assembly device may be arranged to weld the jig beam in the first step of the manufacture, and the second assembly device may be arranged to receive the jig beam and to weld the side web plates to the jig beam in the second step of the manufacture. Thus, there may be one assembly device line for manufacturing the middle web and another or more lines for joining the side plates to the beam with a middle web. All these devices or lines may have a measuring, monitoring, and control apparatus for heat input or energy input so as to be able to take into consideration possible changes in the curvature of the beam or to cause changes knowingly in the beam or its curvature. The tolerances of the beam can thus be monitored in such a manner that energy input into each weld is the same and/or as required.

Thus, the apparatus also comprises a straightener that is arranged to straighten flanges, and a bending device that is arranged to provide the curvature of the beam jig in a three-web beam or the middle web or the entire beam, if necessary.

The manufacture of the beam may take place in two or more steps, in which one, two or more apparatuses may be used. The manufacture may be divided into different steps in such a manner that first, in the first step, an H beam with a middle web having a web plate and flanges, that is, a jig beam, is manufactured. When both sides of the H beam have been welded, side plates are added on both sides of the H beam in the second step. However, before the step of adding the side plates to the beam, the H beam may be run through the straightener for straightening the flanges in a third step. When all side plates, that is, side webs, have been added to the beam, the curvature of the beam may be vertically and/or horizontally fine-adjusted and the beam checked and measured at a bending station in a fourth step.

According to the invention and its preferred embodiments, the manufacturing method and apparatus take into consideration, monitor and/or measure factors that affect one or more deformations of a beam part, beam or beam entity, and take any necessary action. The adjustments of the various factors affecting deformation can be done automatically or as a combination of automatic and manual straightening, and in manual straightening, the product is heated manually. For this purpose, the method and apparatus for manufacturing a beam comprise a control apparatus that performs the actual energy input measurement, for instance. Thus, the apparatus may comprise an automated deformation measuring system, in which the control system of the apparatus monitors the energy input to the welds of the products by each weld or weld group. The apparatus automatically adjusts and controls the energy input through each weld or weld group so as to minimize deformation in the product being manufactured and reduce the need for straightening. In addition, the manufacture of the product is less expensive in factory scale. However, it should be noted that straightening merely by hand—as is done in the prior art—decreases the competitive advantages of a product made of steel in comparison with other materials, such as concrete, and is also an unreliable and uneconomical method.

The method and system of the invention provide the advantage that it is possible to manufacture during the manufacturing process automatically a dimensionally accurate beam according to the specification, that is, a final product complying with the manufacturing tolerances. The method, apparatus, and beam of the invention and its preferred embodiments may be used for many different purposes, such as for manufacturing rail beams, for instance Maglev rail beams, or bridge structures.

It is obvious to a person skilled in the art that, as technology advances, the basic idea of the invention may be implemented in many different ways. The invention and its embodiments are thus not restricted to the examples described above, but may vary within the scope of the claims.

The invention claimed is:

1. A system for manufacturing a beam having parts comprising a bottom flange, a top flange, a middle web plate, and at least first and second side web plates, said system comprising:
   an assembly conveyor that receives at least two of said beam parts, sets them together with pressure rolls of the assembly conveyor to form said beam with a final cross-section, and transfers the joined beam parts to an assembly device;
   an assembly device which receives the joined beam parts and which assembly device comprises:
   a welding machine that welds together the joined beam parts by welding the middle web plate at least at one point to the bottom flange, and at least at one point to the top flange to form a jig beam, and by welding a first one of the side web plates to a first edge of the jig beam, and at a distance from the first side web plate, to an opposite, second edge a second one of said side web plates by welding both the first side web plate and the second side web plate on at least one side to the bottom flange and top flange;
   an adjusting device; and
   an energy measuring device that measures energy input into the joining point of the parts being connected during the joining and transmits the measured energy amount to said adjusting device;
   wherein said adjusting device receives from the energy measuring device the measured energy amount, calculates the energy amount to be input into a joining point of the parts being welded at least partly on the basis of the measured energy amount, and transmits the calculated energy amount to be used in welding to the welding machine;
   further comprising:
   a turning device that:
   receives from the assembly device one of:
   said beam; and
   a part thereof;
   turns said one of said beam and a part thereof; and
   feeds said one of said beam and a part thereof back to the assembly conveyor for a second step of welding the beam.

2. A system for manufacturing a beam having parts comprising a bottom flange, a top flange, a middle web plate, and at least first and second side web plates, said system comprising:
   an assembly conveyor that receives at least two of said beam parts, sets them together with pressure rolls of the assembly conveyor to form said beam with a final cross-section, and transfers the joined beam parts to an assembly device;
   an assembly device which receives the joined beam parts and which assembly device comprises:
   a welding machine that welds together the joined beam parts by welding the middle web plate at least at one point to the bottom flange, and at least at one point to the top flange to form a jig beam, and by welding a first one of the side web plates to a first edge of the jig beam, and at a distance from the first side web plate, to an opposite, second edge a second one of said side web plates by welding both the first side web plate and the second side web plate on at least one side to the bottom flange and top flange;
   an adjusting device; and
   an energy measuring device that measures energy input into the joining point of the parts being connected during the joining and transmits the measured energy amount to said adjusting device;
   wherein said adjusting device receives from the energy measuring device the measured energy amount, calculates the energy amount to be input into a joining point of the parts being welded at least partly on the basis of the measured energy amount, and transmits the calculated energy amount to be used in welding to the welding machine;
   further comprising:
   a straightener for straightening said one of the beam and a part thereof; and a bending device for bending said one of the beam and said part thereof.

3. A system for manufacturing a beam having parts comprising a bottom flange, a top flange, a middle web plate, and at least first and second side web plates, said system comprising:

an assembly conveyor that receives at least two of said beam parts, sets them together with pressure rolls of the assembly conveyor to form said beam with a final cross-section, and transfers the joined beam parts to an assembly device;

an assembly device which receives the joined beam parts and which assembly device comprises:

a welding machine that welds together the joined beam parts by welding the middle web plate at least at one point to the bottom flange, and at least at one point to the top flange to form a jig beam, and by welding a first one of the side web plates to a first edge of the jig beam, and at a distance from the first side web plate, to an opposite, second edge a second one of said side web plates by welding both the first side web plate and the second side web plate on at least one side to the bottom flange and top flange;

an adjusting device; and an energy measuring device that measures energy input into the joining point of the parts being connected during the joining and transmits the measured energy amount to said adjusting device;

wherein said adjusting device receives from the energy measuring device the measured energy amount, calculates the energy amount to be input into a joining point of the parts being welded at least partly on the basis of the measured energy amount, and transmits the calculated energy amount to be used in welding to the welding machine;

further comprising:

two assembly devices, the first assembly device being arranged to weld the middle web plate to the bottom flange to the top flange to form said jig beam, and the second assembly device being arranged to receive the jig beam and to weld the side web plates to the jig beam.

* * * * *